US008851827B2

(12) United States Patent
Burgstaller et al.

(10) Patent No.: US 8,851,827 B2
(45) Date of Patent: Oct. 7, 2014

(54) AUTOMATED SYSTEM AND METHOD OF AUTOMATICALLY ORDER-PICKING OR CONSOLIDATING ARTICLES (75) Inventors: Albert Burgstaller, Friesach (AT); Michael Gruber, Anger (AT); Franz Bauer-Kieslinger, Kaindorf b. Hartberg (AT)

(73) Assignee: Salomon Automation GmbH, Friesach (AT)

(*) Notice: Subject to any disclaimer, the term of this patent is extended or adjusted under 35 U.S.C. 154(b) by 1232 days.

(21) Appl. No.: 12/278,951

(22) PCT Filed: Feb. 9, 2007

(86) PCT No.: PCT/EP2007/001112
§ 371 (c)(1),
(2), (4) Date: Aug. 8, 2008

(87) PCT Pub. No.: WO2007/124796
PCT Pub. Date: Nov. 8, 2007

(65) Prior Publication Data
US 2009/0010741 A1    Jan. 8, 2009

(30) Foreign Application Priority Data
Feb. 16, 2006   (AT) .................................. A 241/2006

(51) Int. Cl.
*B65G 1/00*     (2006.01)
*B65G 1/137*    (2006.01)
(52) U.S. Cl.
CPC .......... *B65G 1/1378* (2013.01); *B65G 2209/08* (2013.01); *B65G 2201/0261* (2013.01)
USPC ........................................... 414/807; 700/216
(58) Field of Classification Search
USPC ......... 414/266, 267, 268, 269, 286, 799, 807; 700/214, 216
See application file for complete search history.

(56) References Cited

U.S. PATENT DOCUMENTS

| 3,221,894 | A | * | 12/1965 | Knuth | 211/134 |
|---|---|---|---|---|---|
| 3,360,137 | A | * | 12/1967 | Novales | 211/175 |
| 4,030,611 | A | * | 6/1977 | Konstant | 211/191 |
| 4,678,390 | A | * | 7/1987 | Bonneton et al. | 414/282 |
| 4,772,176 | A | * | 9/1988 | Montgomery | 414/800 |
| 5,301,261 | A | * | 4/1994 | Poole et al. | 700/247 |
| 5,564,879 | A | * | 10/1996 | Noguchi | 414/268 |
| 5,664,928 | A | * | 9/1997 | Stauber | 414/269 |
| 6,264,421 | B1 | * | 7/2001 | Burkert | 414/791.6 |

(Continued)

FOREIGN PATENT DOCUMENTS

| DE | 31 00 020 | 7/1982 |
|---|---|---|
| DE | 33 43 858 | 6/1985 |

(Continued)

*Primary Examiner* — Saul Rodriguez
*Assistant Examiner* — Glenn Myers
(74) *Attorney, Agent, or Firm* — Schlee IP International, P.C.; Alexander R. Schlee (57) ABSTRACT The invention relates to a method for automatically order-picking or consolidating articles of a wide variety of different formats and varieties, using the following steps: separating the stored articles, storing the articles in a rack bay, retrieving the articles and palletizing them. The method is predominantly characterized in that the articles which are to be order-picked for an order are put together in a rack bay already in the sequence which is necessary for palletizing. The invention also relates to an installation for implementing the method.

7 Claims, 6 Drawing Sheets

(56) References Cited

U.S. PATENT DOCUMENTS

| | | | |
|---|---|---|---|
| 6,450,751 B1* | 9/2002 | Hollander | 414/268 |
| 6,671,767 B2* | 12/2003 | Furuumi et al. | 711/100 |
| 6,881,916 B2* | 4/2005 | McLaughlin et al. | 209/584 |
| 6,952,681 B2* | 10/2005 | McQuade et al. | 705/28 |
| 7,066,315 B2* | 6/2006 | Tanaka | 198/349 |
| 7,210,624 B1* | 5/2007 | Birjandi et al. | 235/385 |
| 2003/0176944 A1* | 9/2003 | Stingel et al. | 700/215 |
| 2004/0162631 A1* | 8/2004 | Roth et al. | 700/217 |
| 2004/0193311 A1* | 9/2004 | Winkler | 700/216 |
| 2005/0047895 A1* | 3/2005 | Lert, Jr. | 414/273 |
| 2005/0178685 A1* | 8/2005 | Corcoran et al. | 206/369 |
| 2005/0230222 A1* | 10/2005 | Olson et al. | 198/465.1 |
| 2006/0182543 A1* | 8/2006 | Schaefer | 414/222.01 |
| 2006/0212164 A1* | 9/2006 | Abraham et al. | 700/215 |

FOREIGN PATENT DOCUMENTS

| | | |
|---|---|---|
| DE | 202 11 321 | 1/2003 |
| EP | 0 244 805 | 11/1987 |
| EP | 0 627 371 | 12/1994 |
| EP | 1 462 393 | 9/2004 |

* cited by examiner

AUTOMATED SYSTEM AND METHOD OF AUTOMATICALLY ORDER-PICKING OR CONSOLIDATING ARTICLES

CROSS REFERENCE TO RELATED APPLICATIONS

This patent application is the National Phase of the International Patent Application PCT/EP2007/001112 filed on Feb. 9, 2007, claiming priority from the Austrian Patent Application A 241/2006 filed on Feb. 16, 2006. Both applications are herewith incorporated entirely by reference.

BACKGROUND OF THE INVENTION

The invention relates to a process for automatic picking or consolidating of articles of very different formats and assortments, including a stage for separating the articles stored, storing the articles in a rack bay, retrieving the articles, and palletising them. Furthermore, the invention relates to a plant for implementing the process.

In classic, manual picking systems, all article pallets/packages are placed ready for picking in floor storage areas or racks along defined picking corridors. In order to assemble the order (picking), the operator drives or walks along the picking route and loads (picks) the picking items specified by the order (issue quantity) on the accompanying loading device (pallet, container on wheels, container, box, . . . ). When the picking order is complete, the loaded order pallet is placed ready in the outgoing goods zone of the loading bay or for further processing. The principle of inverse picking is based on the loading devices on which the individual picking orders are loaded being placed at fixed points and the employee moving the article pallets (source pallets) past the order-related loading devices and picking from the article pallet (source pallet) onto the fixed-location and order-related loading device (article pallet moves, order-related target package unit "waits"). Processes of this type are known, e.g. from EP 1 462 393. If, however, an article that has to be stored low down on the target package due to peripheral circumstances (weight, stability of the target package unit) is not delivered for picking until later, the remaining items of the picking order also cannot yet be picked properly and must therefore be put into intermediate storage.

The purpose of the invention is to eliminate this disadvantage and enable faster picking, where each individual step can also be automated.

SUMMARY OF THE INVENTION

The invention is thus characterised by the articles to be collected for an order already being collected in a rack bay in the sequence required for palletising. As a result, the sorting process otherwise required before palletising can be omitted.

A favourable further development of the invention is characterised by a fictitious part of the rack being assigned to an order. Thus, all of the articles for an order can be collected regardless of the physical design of the rack.

An advantageous embodiment of the invention is characterised by the number of storage spaces reserved for an order in the rack bay being adjusted dynamically to the loading quantity for the respective delivery package unit. Thus, the rack can also be utilised to the optimum when orders are of different sizes.

If the individual articles are stored next to each other in the rack bay, regardless of whether they are directly above or beside one another, stacked singly or several layers deep, they can be assigned precisely at any time and only a short distance is covered to retrieve them.

A favourable embodiment of the invention is characterised by the articles being stored on trays. Thus, several articles can also be stored and transported at once. Standardised transport can also be performed easily using conventional devices.

A particularly favourable development is characterised by retrieval beginning with the bottommost tray or package unit, and continuing with the package unit stored at the next level in each case. As a result, the retrieving device can retrieve all trays and/or package units belonging to one order easily without having to move back to an idle position. This achieves very high retrieval performance.

An advantageous embodiment of the invention is characterised by the retrieved package units being brought directly to the delivery package unit. With appropriate preparation, the delivery package unit can be filled directly without any further sorting or intermediate storage of the articles.

The invention also relates to a plant for automatic picking or consolidating of articles of very different formats and assortments, with the units rack bay, retrieving unit for the articles, and palletising device.

In the plant according to the invention, a rack bay is provided in which the articles to be collected for an order are already assembled in the sequence required for palletising. Thus, the sorting process otherwise necessary before palletising can be omitted.

A favourable further development of the invention is characterised by the rack bay having a number of rack columns that are divided into fictitious storage zones. Thus, all articles can be collected regardless of the physical design of the rack, and the rack is also used to the optimum when filled accordingly.

It is favourable if the rack can hold trays loaded to different heights. In this way, most packages can be stored and retrieved automatically.

An advantageous embodiment of the invention is characterised by a rack feeder being provided for retrieval, which has a load-bearing means to hold the filled trays or loose article packages, where the rack feeder can have a vertical conveyor. Highest retrieval performance can be achieved with this rack feeder. An advantageous development of the invention is characterised by the rack bay having a number of transport units for the goods to be picked, where the transport units can hold the trays with the articles for an order. Thus, the packages for the orders can be collected easily and conveyed all together.

It has proved particularly favourable if the transport units are designed as self-supporting racks, which can also be stored on pallets. Thus, they can be conveyed easily using conventional transport means.

The invention can also be used to advantage in consolidating orders. In this case, articles that have already been picked using other processes are stored in the rack bay according to the orders and also placed in the rack bay in the order package unit in the sequence specified. Thus, orders that are assembled in different picking processes can be added to the order package unit together in the desired sequence. As a result, so-called fast-moving articles can be assigned to an order together with so-called slow-moving articles or articles to be picked manually and then brought to the appropriate order package unit. Any de-palletising that would otherwise be required can, of course, be omitted for the articles already picked.

BRIEF DESCRIPTION OF THE DRAWINGS

The invention is now described in examples based on the drawings, where.

DETAILED DESCRIPTION OF THE DRAWINGS

Figure 1:
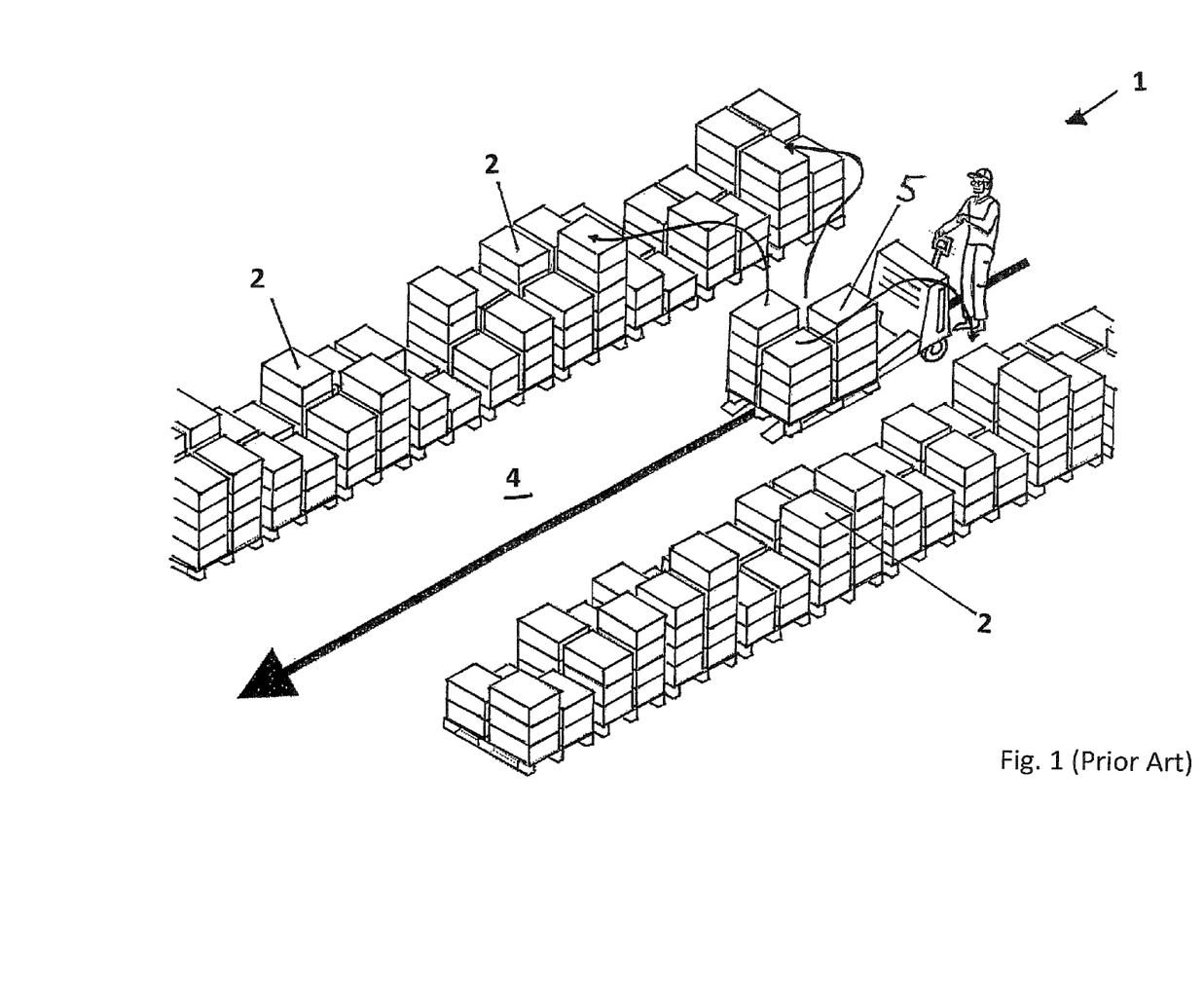
FIG. 1 shows a diagram of traditional, manual inverse picking.

FIG. 1 shows the traditional inverse picking process, where all order pallets or order package units 2 are placed ready on floor areas or racks, as the case may be, along defined picking corridors 4 in a warehouse 1. In order to assemble the order (picking), the employee drives or walks along the picking route 4 and assigns the articles 5 to the individual orders or to the order pallets or package units 2 assigned to the orders. When the picking order is complete, the loaded order pallet or package unit 2 is placed ready in the outgoing goods zone of the loading bay or for further processing. The principle of inverse picking is based on the loading equipment (order pallets 2) on which the individual delivery orders are loaded being placed at fixed points, and the employee then travels with the source pallets, each containing one article type, through the picking corridors 4 past the order-related loading equipment 2 and picks from the source pallet to the fixed-location, order-related loading equipment 2 (source pallet moves—order-related target package "waits").

Figure 2:
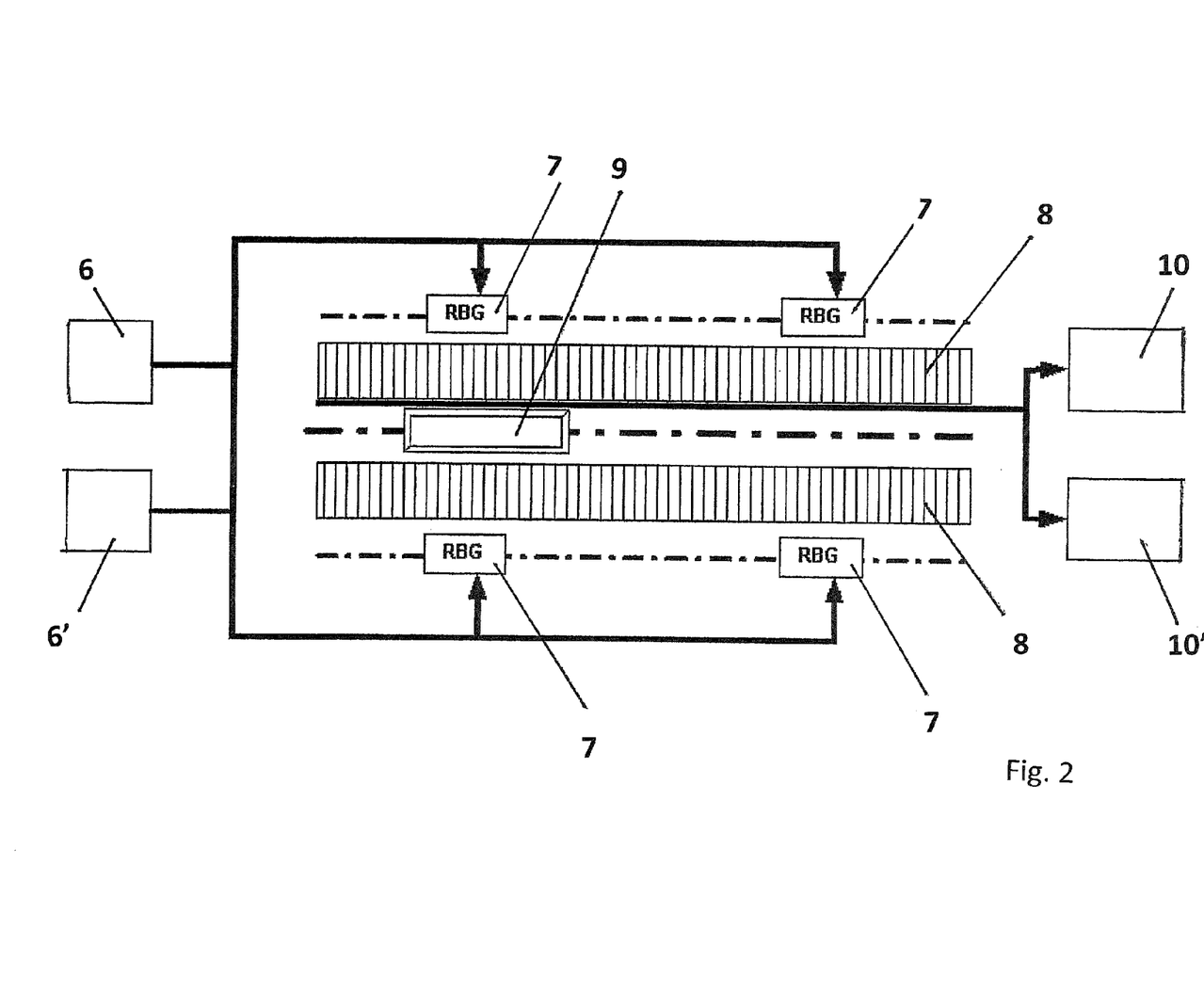
FIG. 2 a schematic flow sheet of picking according to the invention.
Figure 3A:
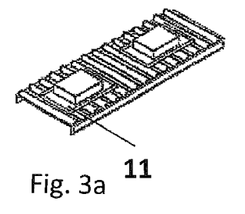
FIGS. 3a to 3e variants for loading the trays.
Figure 3B:
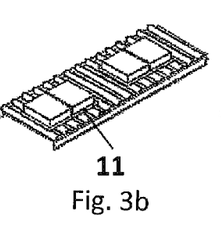
Figure 3C:
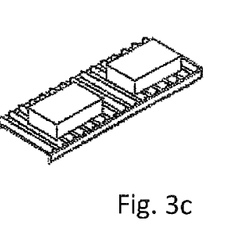
Figure 3D:
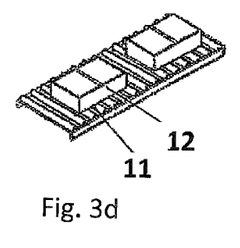
Figure 3E:
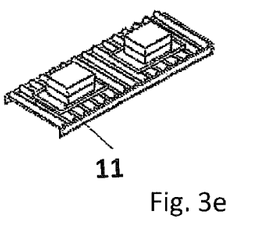

The basic structure of a plant according to the invention is shown in FIG. 2. The articles supplied are separated in an automatic 6 or manual 6' de-palletising unit, and the individual article packages are put into storage on a rack 8 by one or several rack feeders (RGB) 7. Articles are retrieved using a special picking device 9, then the individual article packages are brought to an automatic 10 or a manual 10' palletising unit, where the order package unit is then completed. With storage and retrieval according to the invention, subsequent sorting can be omitted before palletising.

The picking process according to the invention is based on the article items/packages needed to assemble the order (picking) either being manipulated and transported themselves automatically and stored in a conventional container rack or being placed on loading devices (containers, trays) that can be manipulated and transported automatically.

The article packages can be separated or repacked on defined loading trays prior to picking, with the trays being stored temporarily in an automatic small parts warehouse (neutral storage). If the delivery orders are known, this can also be handled specific to each order directly before the picking process in a re-packing or de-palletising area 6, 6' (automatically or manually). If the article packages are separated beforehand without reference to orders or repacked on defined loading trays, only one package (smallest picking unit per article) can be placed on each loading tray. If the articles are separated immediately before picking or the orders are known at the time of separation, then more than one package can be placed on each loading tray (not more than the number of delivery item packages for the order). Since the delivery items are loaded on the trays according to the order, picking performance of the overall system is maximized.

FIGS. 3a to 3e show possible examples for loading of the individual trays 11 with one package per tray 11 (FIG. 3a), several packages per tray 11 (FIG. 3b), loose packages (FIG. 3c), containers 12 with several packages loaded on trays 11 (FIG. 3d), as well as stacks of packages on trays 11 (FIG. 3e), depending on the type of articles and requirement of the order.

The source pallets are brought to the de-palletising area 6, 6' automatically or manually. The de-palletising area can be designed for automatic 6 or manual 6' operations (depending on the physical properties of article packing). The article packages separated at the de-palletising area 6, 6' are loaded on system trays 11 automatically or manually, where more than one package can also be loaded on a tray 11. The empty trays 11 are brought to the de-palletising area 6, 6' automatically. Articles whose physical properties are such that no tray 11 is required for further manipulation are separated at the de-palletising area 6, 6' either automatically or manually and transferred directly to the outbound conveyors, e.g. roller or belt conveyors, (loose article packages).

The trays 11 loaded according to order by the de-palletising equipment, or from the buffer store, or loose article packages are put into storage in a conventional rack 8 for containers by means of automatic stackers 7, where the "ingoing storage strategy", i.e. which loaded tray 11 or which loose article package is stored where and how, is an essential component of the process according to the invention. The rack 8 can be designed either for single-depth or for multiple-depth storage of trays 11 or loose article packages.

The loaded trays 11/loose article packages 5 are put into storage according to a loading pattern calculated beforehand by the system to take account of the loading sequence of the delivery package unit (e.g. container on wheels, pallet, . . . ). For this purpose, fictitious storage zones 13 with a number of storage spaces 14 resulting from the loading quantity and loading sequence calculated beforehand are reserved for the resulting delivery package units for the order. The size, i.e. the number of storage spaces 14, changes dynamically with the loading quantity for the respective delivery package unit, which optimizes the filling level of the rack 8. The picking process according to the invention ensures further that the delivery items (trays with article packages or loose article packages) belonging to an order-related delivery package unit (container on wheels, pallet, . . . ) are stored in storage spaces 14 in the immediate vicinity (above, beside, etc.). Thus, the storage capacity of a fictitious storage area 13 is equal to the load of a delivery package unit.

Figure 4:
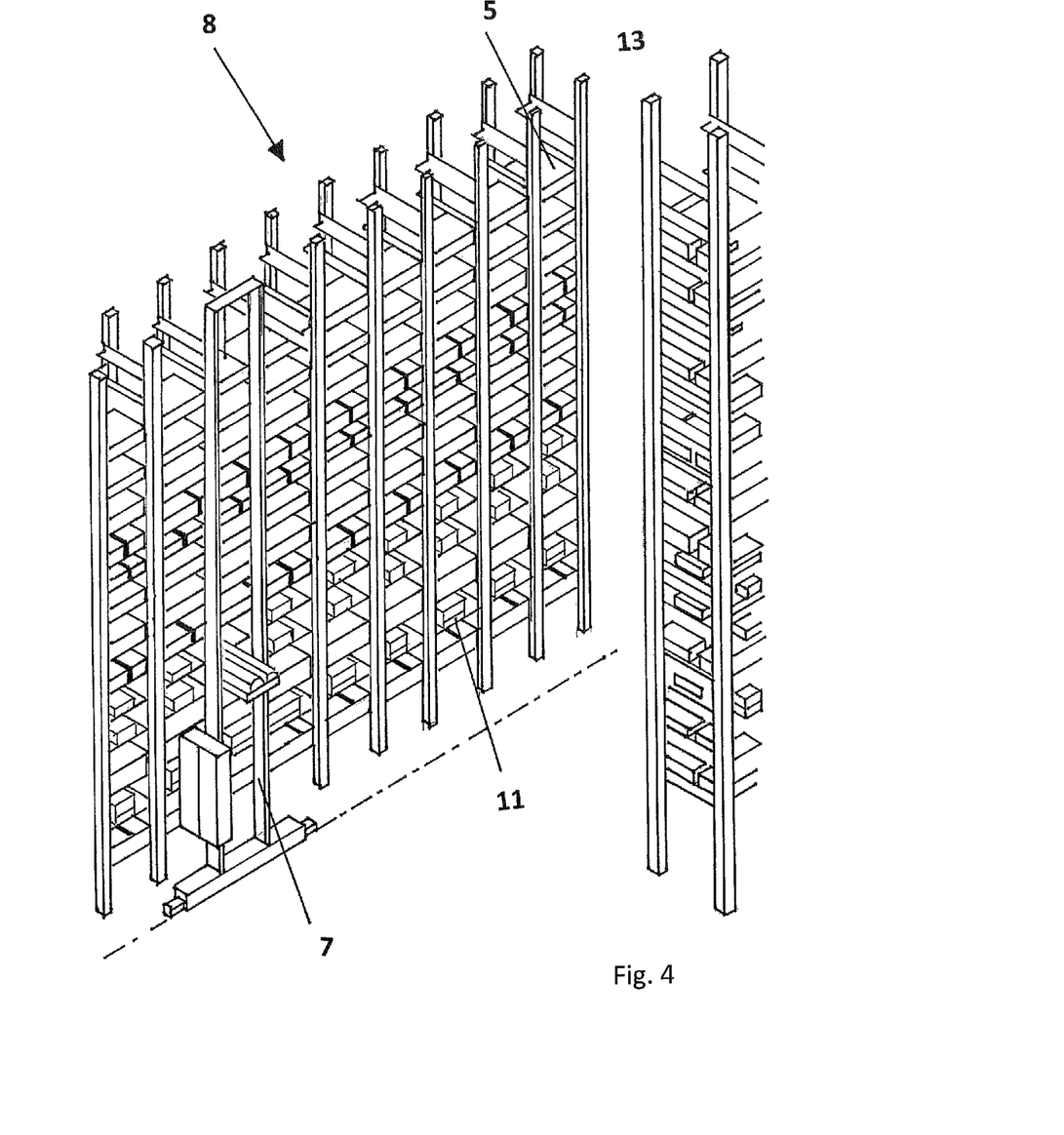
FIG. 4 a rack according to the invention.

FIG. 4 now shows a rack 8, where the individual article packages 5 are put into storage by a rack feeder 7. An essential component of the picking process according to the invention is retrieval of order-related trays 11 pre-sorted in "fictitious" storage zones 13 and loaded with articles 5, or of loose article packages 5. The trays 11 belonging to a delivery package unit or loose articles 5 in a rack column are stored directly above one another, stacked singly or several layers deep.

Figure 5:
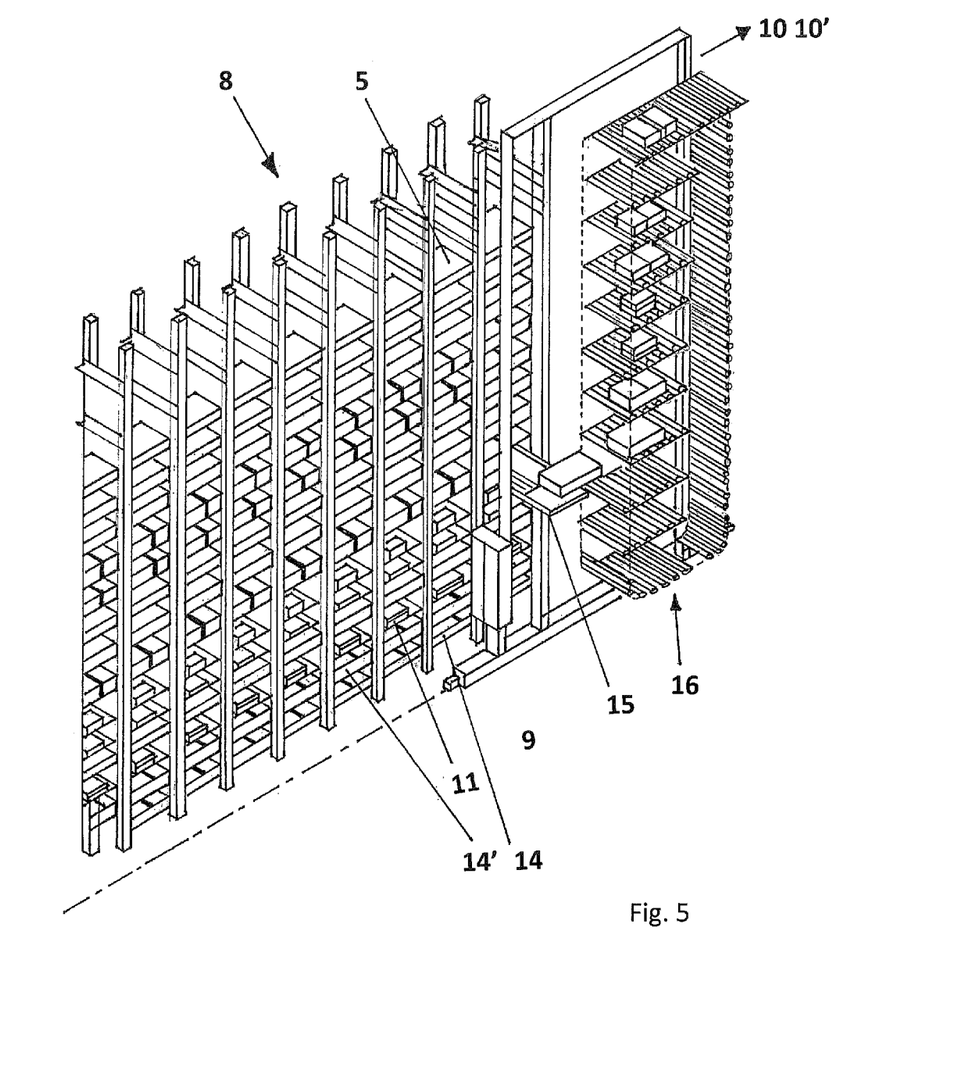
FIG. 5 a rack with rack feeder according to the invention.

FIG. 5 shows retrieval of the trays 11 loaded with the articles 5 or loose article packages 5. For this purpose, a special rack feeder 9 with a special load-bearing means 15 is used to hold the trays 11 loaded with article packages 5 or the loose article packages 5 on the one hand, as well as a powerful vertical conveyor 16 (Z-conveyor, paternoster, or similar) as integral component on the other hand. The load-bearing means 15 retrieves (removes) the trays 11 loaded with article packages 5 or the loose article packages 5 from the rack 8 and transfers them to the on-board vertical conveyor 16 by means of the conveying equipment, e.g. roller or belt conveyors, installed on the rack feeder 9. The vertical conveyor 16 then passes the trays 11/loose article packages 5 on to a conveying plant which is used to transport them onwards to the palletisers 10, 10'. In the invention it is useful if the load-bearing means 15 for removing the trays 11/loose article packages 5 moves in beneath the bottommost storage space 14 of the "fictitious" storage zone—assigned exactly to a delivery package unit at the given moment—retrieves the trays 11 and/or loose article packages 5 stored at this level of the rack 8 and then—without moving the load-bearing means 15 back to the "waiting position—middle position" again—lifts them to the next storage space up 14' with one lifting movement and retrieves the next trays 11/loose articles 5. At the same time, the retrieved trays 11/loose article packages 5 are conveyed towards the palletisers 10, 10' by the vertical conveyor 16. This process achieves very high retrieval performance.

The packages to be palletised on delivery package units are retrieved according to the process described above and brought to the palletisers by an automatic conveying plant. Before palletising, those delivery items loaded on a tray must be removed from the tray. This can be achieved automatically or manually. The packages are delivered to the palletising area in the sequence required for palletising, where the sequence is already formed in the warehouse. With these procedures, there is no need for the sorting equipment otherwise required.

Furthermore, the delivery package units can be loaded easily according to the necessary peripheral circumstances (including weight, stability).

Figure 6:
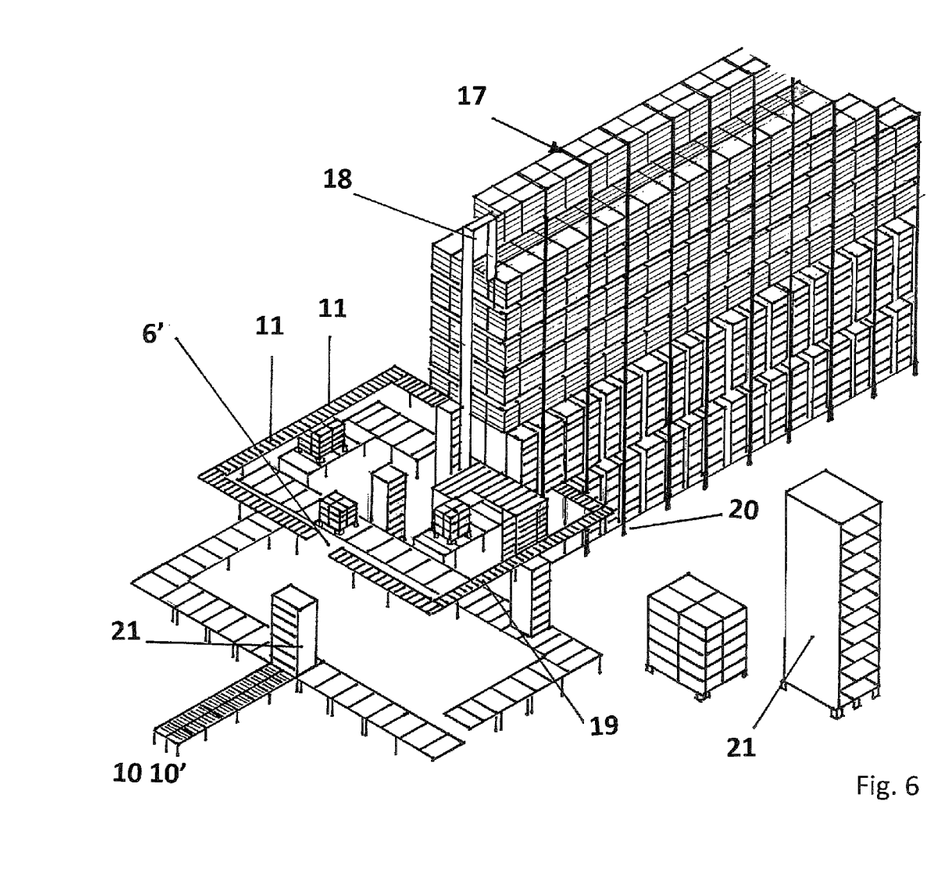
FIG. 6 an alternative design of the invention.

FIG. 6 shows an alternative embodiment of the invention. Here, the articles are brought on a rack feeder 18 from a pallet store 17 with the articles to be picked to a de-palletising area 6' (shown here as manual workplace) and separated or stored on trays 11. These trays 11 are then brought on conveying equipment 19 to a rack feeder 20, which brings these trays 11 to the appropriate locations of the order transport units 21. In this case, the order transport units 21 are mounted in racks under the pallet store 17, so they do not need a large storage space. Here, too, the articles are already allocated according to the orders so that there is no need for sorting later. The order transport units 21 are then brought to the palletisers 10 or 10' using lifting gear, e.g. a conventional fork-lift or an automatic rack feeder (RBG). With suitable devices the bottom level here can also be brought to the palletisers 10, 10' first of all and the order transport unit 21 moved up one level so that the next level can then be emptied and further processed. Normally, the heavy articles are stored at the bottom on the order package unit, e.g. pallet, or in the order transport unit 21 in order to guarantee stability. With the form of storage and retrieval planned, this can be achieved everywhere.

With the selected arrangement of the pallet store 17 above the order transport units 21, this part can also be enclosed effectively and act as a cold store. The articles only need to be brought through the de-palletising area 6 and appropriate lock gates into a room with a slightly higher temperature for a short period before being stored again in the cold store. The orders can also be palletised on order package units in an enclosed room before then being loaded directly into the refrigerated vehicle.

Plants and systems of this kind are used above all for picking and consolidating articles that are assembled in larger units, e.g. for retailing or supermarkets. In particular, they can also be used for picking of fresh products, such as fruit or vegetables.

The invention is not limited to the examples shown in the drawings. De-palletising and palletising areas can be designed to operate either automatically or manually, as required. The arrangement of the racks can also be selected at will.

The invention claimed is:

1. Process for automatic picking or consolidating of articles for a specific order, the picked or consolidated articles being of a variety of very different formats and assortments, said process including a stage for storing the articles in a rack bay, and further comprises the method steps of:
    assigning a virtual storage zone of the rack bay to the order;
    dynamically adjusting a number of storage spaces in the rack bay to a loading quantity for a respective delivery package unit;
    collecting and then storing the articles at a sequence of locations next to each other in the rack bay, said sequence being the same in which the articles are to be placed one by one on pallets;
    retrieving the articles from the rack bay; and
    palletising the articles in said sequence on pallets.

2. The process according to claim 1, further comprising the method step of separating the articles before storing the articles in a rack bay.

3. The process according to claim 1, further comprising the method step of storing the individual articles in the rack bay directly above or beside one another, stacked singly or several layers deep.

4. The process according to claim 1, further comprising the method step of storing the articles on trays.

5. The process according to claim 1, further comprising the method steps of storing of the articles in levels on top of each other with at least a first level and a second level on top of the first level; and beginning retrieval at the first level with a bottommost tray or a bottommost package unit.

6. The process according to claim 5, further comprising the method step of continuing retrieval with the package unit stored at the second level in each case.

7. The process according to claim 6, further comprising the method step of bringing the retrieved package units directly to the delivery package unit.

\* \* \* \* \*